Oct. 27, 1953     W. O. CARTIER     2,656,714
METHOD AND APPARATUS FOR NONDESTRUCTIVE INVESTIGATION
OF MAGNETOSTRICTIVE SOLIDS
Filed April 12, 1949
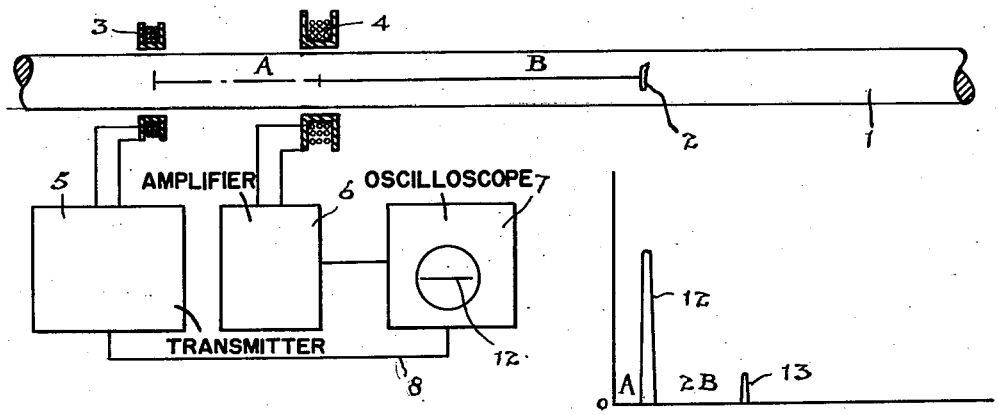
FIG. 1.
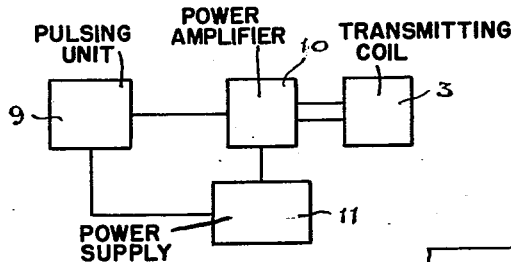
FIG. 3.
FIG. 2.
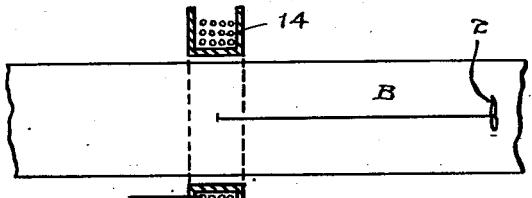
FIG. 4.
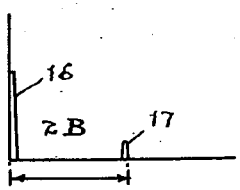
FIG. 5.
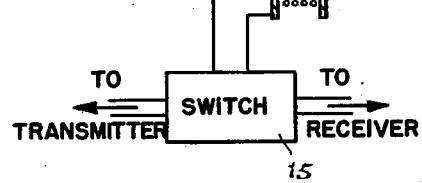
FIG. 6.     FIG. 7.
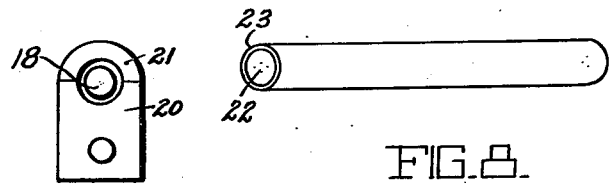
FIG. 8.
Inventor
William O. Cartier
by Douglas S. Johnson
Agent Patented Oct. 27, 1953

2,656,714

UNITED STATES PATENT OFFICE 2,656,714

METHOD AND APPARATUS FOR NON-DESTRUCTIVE INVESTIGATION OF MAGNETOSTRICTIVE SOLIDS

William O. Cartier, Toronto, Ontario, Canada, assignor to The McPhar Engineering Company of Canada Limited, Toronto, Ontario, Canada Application April 12, 1949, Serial No. 87,086

11 Claims. (Cl. 73—67)

This invention relates to the investigation of solids and the principal object of the invention is to provide a dependable non-destructive method and apparatus for investigating magnetostrictive solid materials or members to determine the properties of and/or discontinuities in or boundaries of the material under test, which method can be successfully and easily employed independent of the shape, size and location of the material or member and independent of the physical conditions to which it is exposed.

A further important object is to provide an economical method which can be very expeditiously carried out to detect and locate discontinuities or flaws in a magnetostrictive solid without damage or detriment thereto and which can be effected with the solid or body in situ or service eliminating completely the delays as well as the expenses incident upon removal of the body for investigation under existing methods.

The principal feature of the invention consists in creating a longitudinal mechanical wave in a magnetostrictive solid or a solid to which a magnetostrictive material has been adhered or incorporated, and noting the characteristics of the propagation of such longitudinal wave in its travel through the material to indicate the properties of or discontinuities in the material, the method utilizing the coexistence of a changing magnetic field associated with the change of physical dimension of the material under propagation of such mechanical wave to effect and/or detect the propagation of such wave without contact with the body being investigated and regardless of whether the body is a free body or a restrained body.

More particularly it is the principal feature of the invention to create a substantially pure longitudinal wave while balancing out any interfering transverse waves by subjecting the object under test at a point along its length to a magnetic field change impressed substantially symmetrically of the cross section of the body at that point, and then detecting the longitudinal wave in the absence of interfering transverse waves.

With reference to the accompanying drawings, Figure 1 is an elevational view illustrating the manner in which the non-destructive method may be carried out.

Figure 2 is a diagrammatic view illustrating the signal recorded on the oscilloscope by the method of Figure 1.

Figure 3 is a block diagram of the transmitter used to create the magnetostrictive mechanical wave in the solid under test.

Figure 4 is an elevational view illustrating an alternative method of investigating a magnetostrictive object with a single coil serving as both the detector and transmitter coil.

Figure 5 is a diagrammatic illustration of the pattern obtained on the oscilloscope with the method of Figure 4.

Figure 6 illustrates in section an iron core transmitter coil arrangement including the solid under test as part of the magnetic path of the flux of the coil as an alternative method of creating the mechanical wave in the test material.

Figure 7 is an end view of the iron core energizing coil arrangement arranged to include the solid under test in the path of the flux created by the coil.

Figure 8 is a perspective view of a bar showing it coated with a magnetostrictive material.

It has been proposed to investigate a solid by vibrating the solid with a crystal or other means held in contact with the solid or requiring the solid to be securely restrained and to detect the propagation of the mechanical wave or waves set up by such vibrations by means of a crystal or other mechanical means again in contact with the solid or requiring the solid to be restrained. The study of the travel of the mechanical wave through the solid has then been utilized to ascertain characteristics of the solid, such as discontinuities or properties thereof.

The vibration-creating means and the vibration-detecting means requiring physical contact with the solid or restraint of the solid under investigation has made such previous methods unsatisfactory both from the standpoint of possible damage to the material under test and from the standpoint of rendering the method impossible where the situation or nature of the material which it is desired to test prevents the mechanical vibrators from being brought or maintained in contact therewith or prevents the solid from being restrained or given a hammer blow.

The present method completely overcomes all the disadvantages of the previous methods by enabling the mechanical wave in the solid under test to be both created and detected without physical contact by either energizing or detecting means with the solid material or without requiring the solid to be restrained in any manner.

The present method therefore completely eliminates possibility of damaging the crystal where large power is required and enables the method to be carried out with the solid to be tested in what has been previously considered unaccessible positions.

Other objects and advantages of the present invention will be evident from the following description.

The method herein described and claimed depends upon the phenomenon of magnetostriction. As is well known when a magnetostrictive material experiences a change of magnetic field there is produced a change of dimension or volume of that part of the material subjected to the magnetic field.

The converse is also true, that is, a change of dimension or volume of a magnetostrictive material in the presence of a magnetic field will produce a change of magnetic field. Thus, if a coil is wound about a rod of magnetostrictive material and an alternating magnetic field is produced by a current through the coil the rod changes in length. If the rod is compressed or put in tension while it is subject to a magnetic field, e. g., the residual magnetic field set up when the rod was subjected to the alternating magnetic field and/or the earth's magnetic field, a fluctuating EMF is developed across the coil from the magnetic field change.

Thus if the rod or other magnetostrictive member is subjected to a rapid magnetic field change or pulse a longitudinal mechanical wave, i. e. a wave having a mode of vibration in the direction of its travel and consisting of internal compression and extension will be set up and will travel through the material. This mechanical wave in turn will give rise to and have associated therewith a magnetic field wave which will act to induce a volttage across the detector coil located adjacent to or on the material.

The co-existence of mechanical and magnetic field waves will readily be appreciated from the following explanation:

Under all normal circumstances the rod will always be subjected to the earth's magnetic field. In addition, the magnetic pulse applied to the rod or test piece leaves substantially instantaneously with its application a field of residual magnetic flux in the rod. This residual magnetic field will be maximum at the point of application of the pulse and will decrease with distance along the rod from the point of application towards the residual magnetic flux due to the earth's magnetism and any stray magnetic anomalies coinciding with said latter residual field at infinity.

The longitudinal mechanical or stress wave set up by the magnetic pulse is accompanied by a change in permeability of the magnetic material of the rod or test piece as it is propagated along the test piece. This change in permeability in turn results in a distortion of the residual field previously set up and this distortion travels along the rod or element with the mechanical wave and constitutes an accompanying magnetic field wave.

Under wave propagation theory it is well known that as a wave motion travels through a material a portion of its energy will be reflected at discontinuities in the material and its energy will be reflected at the barriers of the material. Also the properties of the material determine the speed and attenuation of propagation.

It is through the use of the knowledge of the magnetostrictive properties and the knowledge of wave propagation that the present method has been conceived to provide a non-destructive means of detecting discontinuities or flaws in a material or determining the properties or boundaries of the material.

With reference to the accompanying drawings which illustrate various applications of the present invention, Figure 1 illustrates the present method being applied to locate a discontinuity or flaw in a rod 1 which is representative of articles such as bars, cables, wire ropes, tubes, cylindrical, square or rectangular bodies, or other bodies capable of being surrounded by an energizing or a transmitting coil.

The rod 1 is shown as possessing a flaw or discontinuity 2. Surrounding the rod is a transmitting or energizing coil 3 and spaced from the coil 3 a detector 4. As illustrated, the detector coil is spaced a distance A from the transmitter coil and the distance between the detector coil 4 and the flaw 2 is B.

Connected with the transmitter coil 3 is the transmitter or energizing source 5 which, in this application of the present method, is arranged to energize the coil 3 with a pulse or burst of electrical oscillations, which oscillations may be a supersonic frequency. Connected with the detector coil 4 is a receiver or amplifier 6.

The indicator in the method illustrated in Figure 1 is an oscilloscope 7, the sweep circuit of which is synchronized through the lead 8 from the transmitter so that the sweep of the oscilloscope is initiated by the pulse of oscillations delivered to the transmitting coil.

The signal from the receiver coil as suitably amplified through the receiver or amplifier 6 is applied to the vertical deflecting plates of the oscilloscope.

The actual transmitter used is shown in block diagrammatic form in Figure 3 and comprises a pulsing unit 9 for creating a short burst of electrical oscillations and a power amplifier 10 to amplify such oscillationss which are then applied to the transmitting coil represented by the block 3. Power for the transmitter is obtained from the power supply 11.

Upon energizing the transmitting coil 3, which in the form shown in Figure 1 has an air core, a changing magnetic field is created, and it will be appreciated that the rod forms part of the magnetic path of the magnetic lines of force created by this magnetic field.

Thus, through the phenomenon of magnetostriction the part of the bar forming the magnetic path experiences a rapid change in volume, and this change in volume sets up a longitudinal mechanical wave which will travel through the material at a speed of propagation dependent upon the nature of the material. Because the magnetic field change is symmetrical about the axis of the rod the wave set up will be a substantially pure longitudinal wave and no interfering transverse waves will be created.

As this substantially pure longitudinal wave travels outwardly from its point of origin it passes the receiver coil or detector coil 4 after having travelled the distance A. It then continues on a further distance B whereupon it reaches the flaw 2 and a portion of its energy is reflected back, which reflected energy wave will reach the detector coil 4 after having travelled the distance B.

With the arrangement shown in Figure 1 and Figure 2 the creation of the magnetic field pulse at the energizing or transmitting coil 3 initiates the sweep of the oscilloscope and gives the zero reference point.

At a time corresponding to the time taken for the mechanical wave to travel the distance A the receiver or detector coil 4 will be subjected to a magnetic field associated with the mechanical wave through the phenomenon of magnetostriction as explained, and a signal will be developed in the detector coil to be displayed on the oscilloscope as the pulse 12.

At a further time interval corresponding to the time taken for the mechanical wave to travel to the flaw 2 and the reflected wave to travel in reverse back to the detector coil, the detector coil will experience another magnetic field change due to the magnetic field associated with the reflected wave to create a second signal which will be indicated on the oscilloscope by the pulse 13. Thus the presence of the pulse 13 indicates the existence of the flaw or discontinuity 2, and knowing the speed of propagation of the wave in the material under test the location of the flaw can be computed from the observations on the oscilloscope which measures the time of travel of the mechanical energy in the material.

In the method illustrated in Figure 1, a magnetic pulse is applied by the transmitting coil 3 symmetrically to the rod or bar under test. With this arrangement the initial pulse width must be several times shorter than the free period of the material under test so that the propagation of the longitudinal mechanical wave set up in the material can be observed without interference from the transmitted pulse, and the pulse repetition rate must also be such as to be greater than the free period of the material.

Because a substantially pure longitudinal wave as opposed to a transverse wave is employed and its propagation is independent of the conditions of support or state of stress of the body under test, the method is independent of such extraneous factors.

By magnetic pulse it will be understood that a changing magnetic field is meant, that is, the object under test may initially be subjected to a magnetic field or magnetic bias and the magnetic pulse applied thereto is merely to effect a change in the magnetic field at the point of application of the pulse, so that the magnetic field change can, through the phenomenon of magnetostriction, produce the volumetric and/or dimensional change in the presence of a magnetic field linking the test object leading to the creation of a mechanical wave and accompanying magnetic wave moving through the material under test.

From Figure 1 it will be seen that both the transmitting and receiving or detecting coils surround the rod 1 but are out of contact therewith. Without physical contact with the object the method is non-destructive and also may be carried out without requiring the removal of the rod from its physical position which may form part of a structural assembly.

In many instances the rod 1 or object under test may be required to be tested while at extreme temperatures. Again, without physical contact between the coils and the rod the method can be carried out without detriment to the coils and with ease and facility for the operator. Further, it will be appreciated that if the rod or object were made up of a group of elements, e. g. the strands of a wire rope, by creating the longitudinal wave each and every component will be investigated.

Figures 4 and 5 illustrate a modification of the method of Figures 1 and 2. In this case the two coils 3 and 4 are replaced by a single coil 14 which serves alternatively as the transmitting and the detecting coil. Again this coil is arranged to surround the rod or bar 1 so that the bar forms part of the magnetic path of the flux created by energizing the coil. The coil is illustrated as located at a distance B from the flaw 2.

Connected with the coil 14 is a switch 15 which may simply be an overload device such as a standard T-R switch comprising a gas discharge tube which breaks down when the transmitter pulse is applied prevents the signal from the transmitter overloading the receiver.

As the actual circuit arrangements of the transmitter, receiver, oscilloscope and overload switch mechanism are old and their specific arrangements are immaterial to the scope of the present invention, these electrical circuits are indicated in block form only.

In the method of Figures 4 and 5, again a pulse of electrical oscillations is delivered to the coil 14 through the switch 15 to create a magnetic pulse which in turn creates a mechanical pulse in the rod 1. As shown in Figure 5, the pulse from the transmitter is indicated at 16 at the beginning of the trace of the oscilloscope which is initiated by the transmitter.

The mechanical wave travels outwardly from the coil 14 the distance B where a part of its energy is reflected back by the flaw 2, and this reflected energy, upon traversing the distance B back to the coil, develops a signal in the coil through the magnetic field associated therewith, the signal being the result of the subjection of the coil 14 to a magnetic change.

The output signal from the coil 14 which now forms the receiving coil is displayed on the oscilloscope by the pulse 17 which is located at a time interval 2B from the zero point of the sweep of the oscilloscope, this time interval 2B corresponds to the time taken for the mechanical wave to travel outwardly to the flaw and the reflected wave to return to the coil 14.

It will be appreciated that the methods described above are particularly applicable to objects which can be enclosed by an energizing and/or detecting coil which provides a convenient method of symmetrically stressing the object, and it will be appreciated the method can ce carried out equally well whether the body is free or restrained.

In the foregoing applications of the present method the coils have been indicated as air coils. Figure 6 represents a means of creating the mechanical wave in a test object 18 by means of a magnetic core coil. In this case a coil 19 provided with a U-core 20 located on one side of the solid or object 18 is utilized with pole pieces located on opposite sides of the object.

The path of the magnetic flux created by energizing the coil 19 is through the object 18 and the actual phenomena of magnetostriction would take place in the bar without any intimate contact between the magnetic circuit material and the bar or test object 18.

Figure 7 illustrates the end view of the coil arrangement for creating a mechanical wave in the solid under test showing the magnetic circuit formed, the poles 20 and 21 shaped to surround the object to be tested in the shape of a bar or wire 18.

While all of the preceding methods have been described particularly from the standpoint of ascertaining the presence of flaws or discontinuities in the objects under test, it will be appreciated that the present method may be extended to form a means of ascertaining the properties of the material under test, for the time of propagation of the mechanical wave between any fixed distances may be measured with the energizing and detecting apparatus disclosed and also the amplitude attenuation of the detected wave can be determined as a measure of the dampening of the mechanical wave as it travels or propagates through the material.

Thus it will be appreciated that the present method forms a non-destructive method of investigating a material to determine the properties or nature of the material as well as determining discontinuities.

While the foregoing applications of the present method have been described in connection with magnetostrictive materials, it is not intended that the method be restricted to materials of magnetostrictive properties, as it will be appreciated that the method may be carried out on objects which are coated or incorporates a material exhibiting magnetostrictive properties. For instance, if the object to be tested is a metal it may be plated with a material which has good magnetostrictive properties, such as nickel, as illustrated in Figure 8, where the bar 22 of non-magnetostrictive material is coated with a layer of nickel 23. In this case the magnetostrictive coating 23 would generate the pulse of mechanical energy upon being subjected to a magnetic field pulse, and the system would then act in the same way as in the previous systems. Such a method would include all the cases previously mentioned such as rods of various shapes and other solids.

In the case of non-metallic materials, for instance plastics, a coating of magnetostrictive material could be sputtered on or made to adhere to the surface by other means.

In the foregoing the indication from the detector coil has been described as displayed on an oscilloscope. It will be appreciated however that the signal may be recorded for instance on a tape, or it may be measured by other suitable means.

The methods described include the generation of a magnetic pulse, and through the linkage of the magnetic field with the material under test a substantially pure longitudinal mechanical pulse or wave travelling through the material.

It is within the realm of the present invention to subject the material under test to a magnetic field altering with time and measuring for instance the standing waves set up in the material by propagation of the longitudinal mechanical wave under such changing magnetic field through the properties of the magnetostriction phenomenon. Again the initiation of the longitudinal mechanical wave or waves in the material is possible with the present invention without contacting the material under test.

It will therefore be appreciated that the illustrated applications of the present method described above are merely indicative of the various applications which may be made within the scope of the present invention.

While the method has been described particularly in connection with materials so located that they may not properly be contacted by any mechanical means of vibration or to materials where it is desirable that no physical contact with a mechanical vibrator be desired, it will be appreciated that the present invention also provides for the first time a means of investigating a material, the irregular nature of which prevents proper support or contact by a mechanical vibrator, thus greatly extending the application and desirability of the present test or investigating methods.

In addition to testing, it will be appreciated that the above defined methods for locating the boundaries of the object or material under test provides an accurate means of measuring the thickness or length of materials without contact and where it is impossible physically to measure their dimensions. The method is equally applicable to determine the junction of different materials in a laminated structure or the difference of the characteristic of materials at different points throughout a mass, or detecting any impurities or structural changes at any point in the material which would give rise to a reflected energy wave under the transmission of a mechanical wave therethrough.

What I claim as my invention is:

1. A non-destructive method of investigating a body of magnetostrictive material, without regard to restraint on said body, comprising subjecting the material to a magnetic field applied substantially symmetrically of the longitudinal dimension of the body for a short interval to internally stress the body through the phenomenon of magnetostriction to thereby produce a longitudinal physical dimensional change in the material under investigation at the point of application of said magnetic field creating a substantially pure longitudinal mechanical wave travelling through the material, said mechanical wave in turn giving rise to a magnetic field pulse associated therewith through the phenomenon of magnetostriction, and detecting said magnetic field wave associated with said longitudinal mechanical wave to note from characteristics of the propagation of said longitudinal mechanical wave the presence of any discontinuities in the solid in the path of said longitudinal mechanical wave.

2. A non-destructive method of detecting a discontinuity in a body of ferromagnetic or other magnetostrictive material, without regard to restraint on said body, consisting in creating a mechanical wave having a vibration mode longitudinally of said body to travel longitudinally through the body under investigation, and observing reflection of said longitudinal mechanical wave of said discontinuity to detect said discontinuity, said mechanical wave having co-existant therewith as the cause or affect thereof through the phenomenon of the magnetostrictive properties of a ferromagnetic material a magnetic field wave, said longitudinal mechanical wave being created without physical contact with said body by means of a magnetic field applied substantially symmetrically of the longitudinal dimension of said body.

3. A non-destructive method of detecting a discontinuity in a body of magnetostrictive material without regard to restraint on said body consisting in creating a pulse of magnetic field externally of and symmetrically about the longitudinal dimension of said body to internally stress and effect through the phenomenon of magnetostriction a physical dimensional change at the point of application of said magnetic field pulse creating a substantially purse longitudinal mechanical pulse and a co-existant magnetic field pulse travelling through the material, and noting reflections of said longitudinal mechanical pulse from said discontinuity by detecting the magnetic co-existant field pulse associated with said reflected mechanical pulse as an indication of the presence and location of said discontinuity.

4. A method of investigating a solid having magnetostrictive properties, comprising, symmetrically stressing the solid at a point thereof to create a substantially pure longitudinal mechanical wave in the solid by creating a magnetic field change symmetrically applied about said point in the solid, said longitudinal mechanical wave being accompanied by a change in permeability of the magnetostrictive solid and determining the propagation characteristics of said substantially pure longitudinal wave at a point spaced from the point of application of said magnetic field change by detecting changes in permeability of the solid at said spaced point to determine the physical condition of the solid.

5. A method of investigating a solid having magnetostrictive properties comprising, internally stressing the solid at a point by creating a change in magnetic field symmetrically surrounding the solid to create a substantially pure longitudinal wave in the solid, said longitudinal wave being accompanied by a change in permeability, and detecting propagation of said longitudinal wave through said solid by detecting the permeability change accompanying said wave, the propagation characteristic of said wave giving an indication of the physical characteristic of said solid.

6. A method of determining physical conditions of a solid having magnetostrictive properties comprising, internally stressing and creating a longitudinal wave in the solid by creating a magnetic field change symmetrically disposed with respect to the solid to balance out any interfering transverse waves, said longitudinal wave being accompanied by a change of permeability of said solid, detecting propagation of said wave by detecting the accompanying change of permeability, and observing reflections of said wave caused by discontinuities in said solid to determine the presence of such discontinuities.

7. A method as claimed in claim 6 in which the propagation speed is measured to determine the position of any discontinuity.

8. Means for investigating a magnetostrictive body comprising magnetic field generator means to surround said body to produce an internal stress at a point in said body upon change in magnetic field to create a substantially pure longitudinal wave in said body accompanied by a change in permeability of said body, and detector means comprising means surrounding said body and responsive to changes in permeability of said body for determining the propagation characteristics of said wave.

9. A method of investigating a longitudinal body or member having magnetostrictive properties comprising, subjecting said member to a magnetic field bias, stressing said member at a point thereof to create a longitudinal mechanical wave in the member by subjecting said member to a magnetic field pulse, said longitudinal wave being accompanied by a change in permeability of the magnetostrictive body, detecting propagation of said longitudinal wave by detecting the changes of permeability accompanying said wave in the presence of said bias, and utilizing the propagation characteristics of said longitudinal wave to determine physical characteristics of the solid.

10. A method of investigating a longitudinal body or member having magnetostrictive properties comprising, subjecting said member to a magnetic field bias, impressing on the member a magnetic field pulse applied substantially symmetrically around said member at a point along its length to create a substantially pure longitudinal mechanical wave travelling through said member, said longitudinal wave being accompanied by a change in permeability of the magnetostrictive body, and detecting the propagation of said substantially pure longitudinal mechanical wave by detecting the change of permeability accompanying said wave in the presence of said bias to determine physical characteristics of the member.

11. Means for investigating a magnetostrictive body, comprising a pair of spaced coils surrounding said body, means for energizing one of said coils to produce a magnetic field change around said body to internally stress same thereby creating a mechanical wave and an accompanying magnetic wave, and means including indicating means connected to the other of said coils responsive to magnetic field changes acting on the other of said coils due to the magnetic wave.

WILLIAM O. CARTIER.

References Cited in the file of this patent
UNITED STATES PATENTS

| Number | Name | Date |
|---|---|---|
| 2,014,410 | Pierce | Sept. 17, 1935 |
| 2,105,479 | Hayes | Jan. 18, 1938 |
| 2,280,226 | Firestone | Apr. 21, 1942 |
| 2,461,543 | Gunn | Feb. 15, 1949 |